March 5, 1957 W. T. STEPHENS 2,783,745
VALVE MECHANISM FOR HYDRAULICALLY OPERATED MOTORS
Filed July 21, 1953 3 Sheets-Sheet 1

INVENTOR
William T. Stephens
BY Mason, Porter, Diller & Stewart
ATTORNEYS

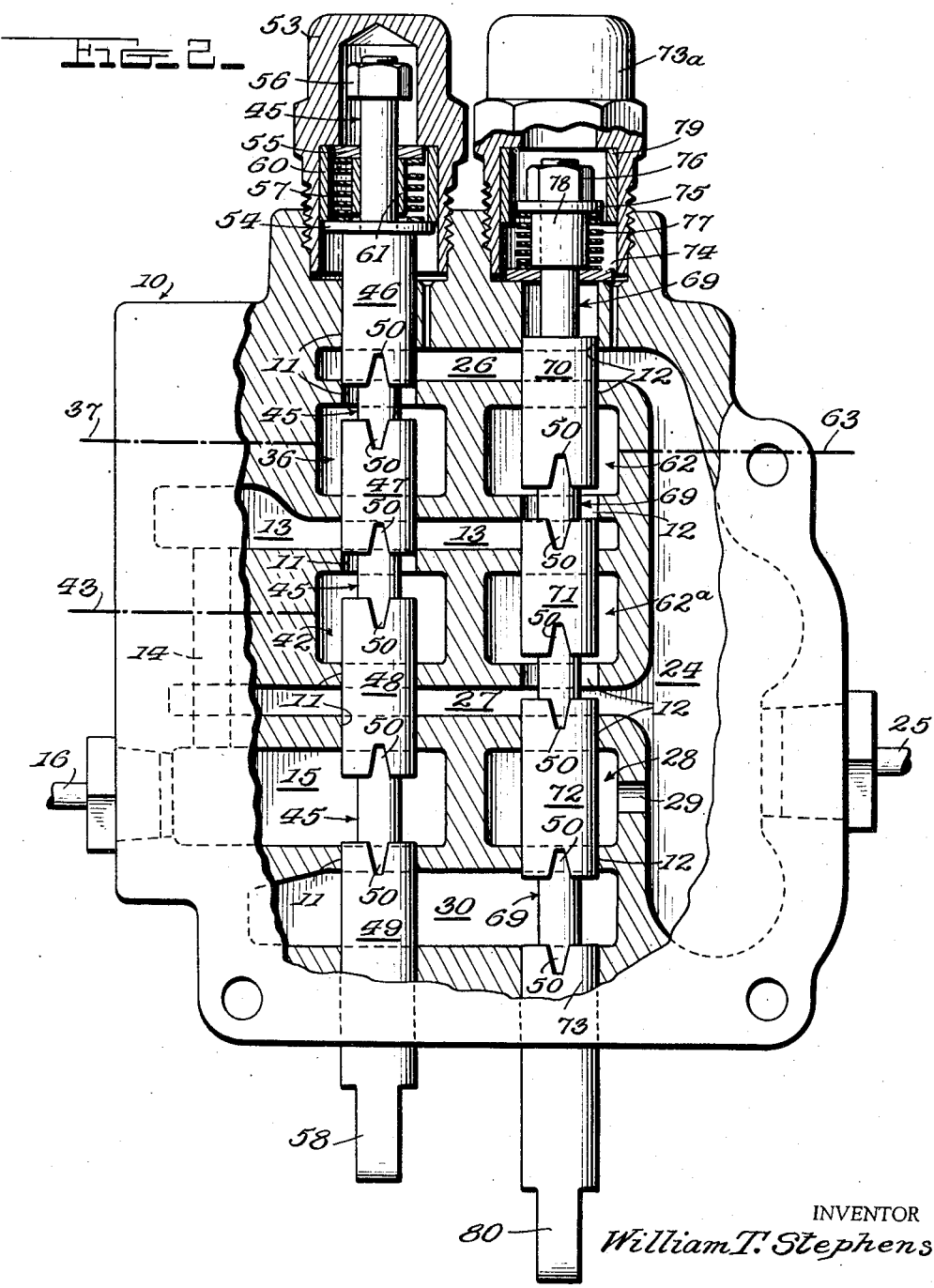

March 5, 1957 W. T. STEPHENS 2,783,745
VALVE MECHANISM FOR HYDRAULICALLY OPERATED MOTORS
Filed July 21, 1953 3 Sheets-Sheet 3
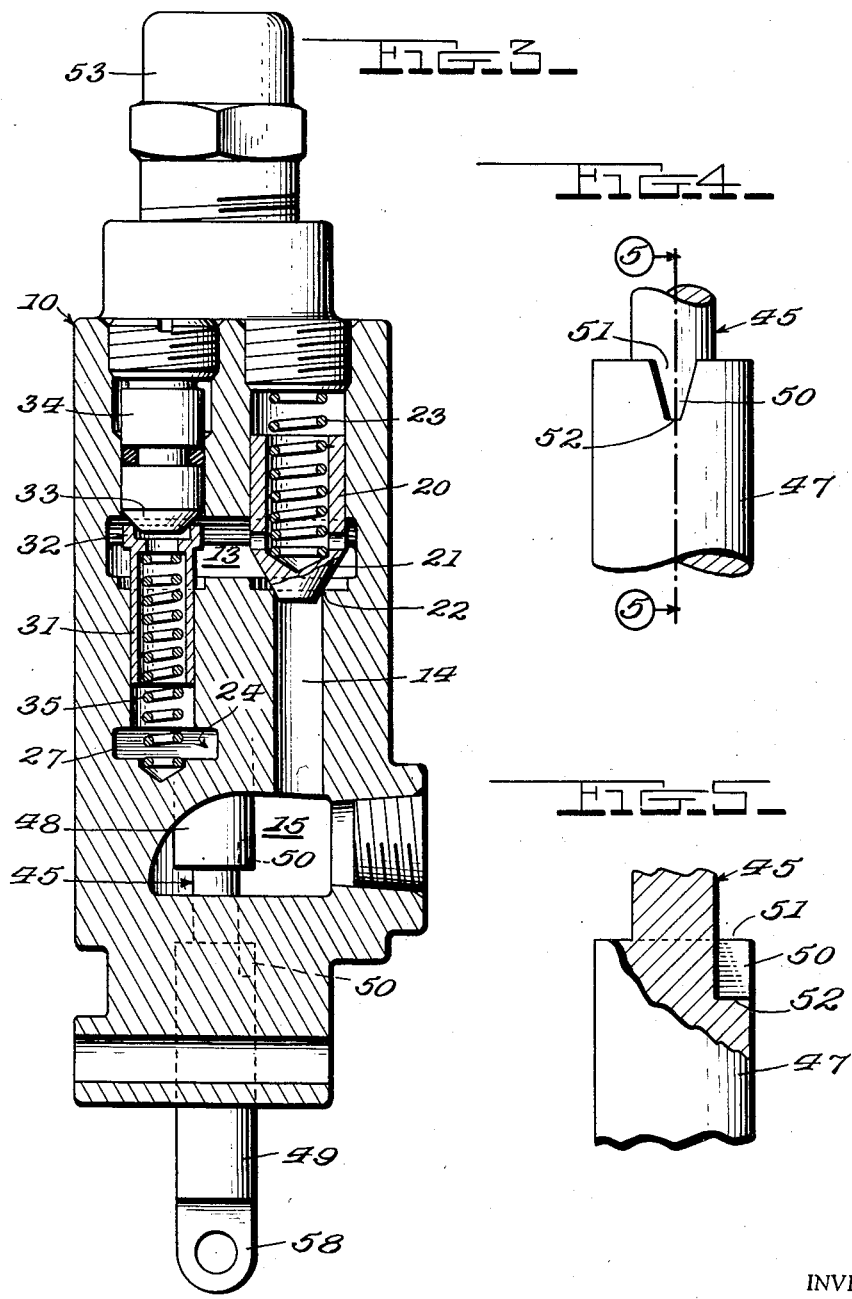
INVENTOR
William T. Stephens
BY Mason, Porter, Diller & Stewart
ATTORNEYS United States Patent Office 2,783,745
Patented Mar. 5, 1957

2,783,745

VALVE MECHANISM FOR HYDRAULICALLY OPERATED MOTORS

William T. Stephens, Painesville, Ohio, assignor to The Parker Appliance Company, Cleveland, Ohio, a corporation of Ohio Application July 21, 1953, Serial No. 369,329

3 Claims. (Cl. 121—46.5)

The invention relates to new and useful improvements in a valve mechanism for hydraulically operated motors and in particular a valve mechanism for controlling the supply of fluid from a single source to a plurality of motors.

An object of the invention is to provide a valve mechanism of the above type wherein the valve housing has a fluid pressure chamber and wherein means is provided for supplying operating fluid taken from said chamber to two or more motors at the same time and at different fluid operating pressures for one or more of the motors.

A further object of the invention is to provide a valve mechanism of the above type wherein spindles having solid lands control the flow of operating fluid to and from the motors and wherein each land has a V-shaped metering slot in the ends thereof actively controlling the flow of fluid, which slot is of uniform depth and extends from the circumference of the land to the surface of the spindle carrying the same and is also of substantially the same transverse dimensions at different radial points so that the rate of fluid flow through a slot will increase uniformly from a minimum to a maximum as the land is shifted to full open position.

Another object of the invention is to provide a valve mechanism of the above type having spindle valves for controlling the supply of operating fluid from a pump to a motor and a by-pass leading from the pump to the tank when the spindle valves are in neutral position and wherein the spindle valves are so timed that the valve controlling the fluid supply opens before the valve controlling the by-pass closes.

A still further object of the invention is to provide a valve mechanism of the above type wherein a spindle valve controls the supply of operating fluid to and from a motor and wherein a spring normally holds the valve spindle in neutral position and stops are positioned relative to one another so that the maximum rate of flow to one end of the motor may be different from the maximum rate of flow to the other end of the motor.

A further object of the invention is to provide a valve mechanism for controlling the operating fluid supplied to the motors wherein the valve spindles may be of identical construction whether supplying fluid to a one-way operating motor or to a two-way operating motor.

These and other objects will in part be obvious and will in part be hereinafter more fully described.

In the drawings which show by way of illustration one embodiment of the invention:

Figure 1 is a sectional view through a valve housing in the plane of the spindles and showing the lands on the spindles in neutral or centered position.

Figure 2 is a similar sectional view of the valve housing but showing the spindles shifted so as to connect the fluid pressure chamber with the motors associated with the respective spindles.

Figure 3 is a sectional view on the line 3—3 of Figure 1.

Figure 4 is an enlarged view of a portion of one of the lands and the spindle supporting the same showing the metering slot in plan view.

Figure 5 is an enlarged detailed view taken diametrically through one of the lands on the line 5—5 of Figure 4.

The invention relates to improvements in a valve mechanism for controlling the supply of fluid under pressure to one or more hydraulically operated motors. The valve mechanism includes a housing 10 having two bores 11 and 12 extending all the way through the housing. Said bores are parallel and spaced from each other. In the housing is a chamber 13 which extends transversely of the bores and is connected thereto. This chamber provides a means whereby the operating fluid may be supplied to the motor or motors under valve control.

The chamber is connected through the passage 14 to an intake chamber 15 and the intake chamber 15 is connected through a pipe 16 to a pump 17 shown diagrammatically in Figure 1. The pump is connected by a pipe 18 to a tank 19 where the supply fluid is initially stored.

The pump 17 draws fluid from the tank and will deliver the same to the pressure chamber 13 in the housing until the maximum pressure on the fluid in the chamber is that of the maximum pressure of the pump. In order to prevent backflow of fluid from a cylinder port when the latter is initially connected to the supply chamber 13 and during the time which it takes for the pump to build up pressure equal to or in excess of that in the cylinder there is a check valve 20 in the passage 14. This check valve has a cone-shaped end 21 and is normally held closed by the spring 23. As soon as the pump pressure has built up to that within the cylinder to be operated the check valve will open and fluid pressure will flow from the pump to the chamber 13 and then to the cylinder being operated.

The housing is also provided with an exhaust chamber 24 which is connected through the pipe 25 to the tank 19. This exhaust chamber has branch passages 26 and 27 which extend transversely to the bores and are connected to both of the bores. The bore 12 has an enlarged port 28 which is illustrated as connected by a passage 29 with the exhaust chamber. There is also in the housing 10 a by-pass chamber 30 which extends transversely of the bores and is connected to each of the bores 11 and 12. This by-pass chamber is connected through the bore 11 with the intake chamber and is also connected through the bore 12 and the ports 28, 29 with the exhaust chamber 24. This provides a by-pass for the fluid passing from the pump to the chamber 13 when the control valves are in neutral or centered position as will be more fully hereinafter described.

There is also a passage connecting the chamber 13 with the branch 27 of the exhaust chamber. This passage is controlled by a relief valve 31. This relief valve is provided with an annular member 32 adapted to engage a tapered seat 33 on a plug 34 threaded into the housing. A spring 35 normally holds the relief valve in engagement with the seat 33 and closes off any connection between the chamber 13 and the branch 27 of the exhaust chamber. The spring is so tensioned that in case the fluid pressure chamber 13 should have a pressure thereon above a desired maximum the valve will open and allow fluid to flow from said fluid pressure chamber 13 to the exhaust chamber until the pressure is lowered to the desired maximum degree.

At one side of the fluid pressure chamber 13 and spaced therefrom the bore 11 has an enlarged port 36. This port is connected by a pipe 37 to the end 38 of a hydraulic motor 39 shown diagrammatically in Figure 1. In this hydraulic motor is the usual piston head 40 attached to a piston rod 41 likewise of the usual construction. On the other side of the chamber 13 from the port 36 is a port 42 which is an enlargement of the bore 11. This port 42 is spaced a short distance from the fluid pressure chamber 13. The port is connected by the pipe 43 with the piston end 44 of the hydraulic motor.

Mounted in the bore 11 is a spindle 45 carrying lands 46, 47, 48 and 49. These lands are spaced from each other and each land is of greater diameter than the spindle and makes a substantially fluid tight engagement with the wall of the bore in which it is located.

Each land at the fluid control end thereof is provided with a metering slot 50. The metering slots are all of the same dimensions and one of the slots is indicated in Figures 4 and 5. The slot is V-shaped and extends from the circumference of the land to the circumference of the spindle on which it is mounted. The slot is of uniform depth all the way from the open end 51 thereof to the inner end 52 thereof. This slot is also of uniform transverse section at all radially spaced points from the spindle to the circumference of the land. The advantages of this particular shaping of the slot will be more fully described hereinafter.

Secured to the housing is a cap 53. This cap is in alinement with the bore 11 and the spindle 45 extends into the cap. Mounted on the spindle adjacent the housing is a washer 54. A second washer 55 is mounted on said spindle adjacent the end of the spindle and is secured from movement along the spindle by a nut 56. Between the washer 54 and 55 is a spring 57. This spring is so tensioned that the spindle is normally held in neutral or centered position. When the spindle is moved in one direction the spring will be compressed against the washer 54 by the washer 55 moving with the spindle. When the spindle moves in the opposite direction the spring will be compressed by the washer 54 moving with the spindle. At this time the washer 55 abuts against the shoulder in the cap 53. Thus it is that the spring when free to move will move the spindle until the washer 55 engages the abutment on the cap and the washer 55 engages the housing and at this time the spindle is in centered or neutral position. The spindle may be moved by any suitable manual means which is connected to the lug 58.

Disposed in the cap is a sleeve 60 which engages the abutment on the cap and when the spindle is moved upward as illustrated in Fig. 2 of the drawings the movement thereof by the manual means will be limited by the washer 54 contacting the end of the sleeve. There is a second and shorter sleeve 61 mounted on the spindle within the spring 57. This sleeve moves with the spindle when it is manually shifted in a downward direction, and will limit the movement by contacting the washer 54. These sleeves serve as stops for the manual shifting of the spindle and the purpose thereof will be more fully disclosed hereinafter.

The bore 12 is provided with an enlarged port 62 which is connected by a pipe 63 with the active end 64 of a one-way hydraulic motor 65 which is indicated diagrammatically in Figure 1. This motor 65 has a piston head 66 connected to a piston rod 67. A spring 68 returns the piston head to the outer end of the cylinder when the pipe 63 is connected to the exhaust chamber.

Mounted in the bore 12 is a spindle 69. The spindle carries lands 70, 71, 72, and 73 which are spaced from each other on the spindle. Each land on the end thereof controlling fluid flow is provided with a metering slot 50 such as described above in detail.

Mounted in the housing 10 is a cap 73a. The spindle 69 extends into the cap. Mounted on the spindle 69 adjacent the housing is a washer 74. There is also a washer 75 at the outer end of the spindle which is engaged by a nut 76. There is a coil spring 77 between the washers which normally holds the spindle in centered or neutral position. There is an inner sleeve 78 and an outer sleeve 79 one of which is shorter than the other and the sleeves function as stops for limiting the movement of the spindle by the manually operated means attached to the lug 80.

The land 71 on the spindle 69 when moved downward controls the flow of fluid from the fluid pressure chamber 13 to the port 62 and from the port 62 to the single actuating motor 65. The vertex of the V-notch 50 will first open to the fluid pressure chamber and a continued shifting of the land 71 in a downward direction as viewed in Figure 1 to the position shown in Figure 2 will gradually open the V-shaped slot 50. It is noted that this slot has a uniform depth and the width only changes and, therefore there will be a uniform increase of flow velocity as the slot opening is made larger due to the fact that the area of opening increases in direct proportion to the increment of spindle travel.

When the spindle is moved downward to effect a connection of the fluid pressure chamber 13 with the motor the lower end of the land 72 will close the connection between the by-pass chamber 30 and the enlargement 28 of the bore 12 and this enlarged bore is connected to the exhaust chamber. When the spindle is raised to the position shown in Figure 1 then the connection from the pressure chamber 13 to the chamber 62 will be closed. This may be termed the neutral or centered position of the spindle and at this time the fluid will be retained in the motor and the load held lifted to a desired extent. When the land 71 moves to this neutral position it will open the port connecting the by-pass chamber through the enlarged bore 28 to the exhaust chamber and thus the pump output is freely bypassed to the tank 19. When the spindle 69 is raised to a further extent the land 70 will connect the chamber 62 with the branch 26 leading to the exhaust chamber. This connects the motor through the pipe 63 and the chamber 62 to the exhaust and permits the piston head to return to the end 64 of the motor cylinder.

The lands 71 and 72 are so dimensioned that the slot 50 on the land 71 connecting the fluid pressure chamber 13 to the motor will open before the slot 50 on the land 72 closes the connection between the by-pass and the exhaust chamber. This will prevent any sudden jerk in the initial movement in the piston of the motor and from the initial opening of the slot permitting flow of fluid pressure to the motor to the full-open position thereof, there will be a gradual increase in the rate of flow.

It is noted that the stop sleeve 79 as illustrated is slightly longer than the inner stop sleeve 78 and therefore the movement of the spindle in an upward direction will be slightly shorter than in the other direction. This difference in movement of the spindle 69 may be utilized to limit the exhausting of the fluid from the motor. That is, the slot for supplying fluid to the motor may be full-open for maximum rate of flow and the slot through which exhaust takes place may be only partially open. It will be understood, of course, that the relative length of the sleeves can be changed and the differential in the strokes of the spindle varied.

There is in the housing a chamber 62a formed by an enlargement of the bore 12. This chamber is plugged when the valve mechanism is connected to a one-way motor through the chamber 62. However, this chamber 62a could be connected to the one-way motor by a similar pipe connection and the chamber 62 plugged. When this change is made then an upward movement of the spindle would connect the chamber 62a with the fluid pressure 13 and fluid would be directed to the one-way motor. At the same time this upward movement of the spindle would cause the land 73 to close the opening 12 between the by-pass chamber and the enlargement 28 of the bore. In this connection it may be noted that the spindles and lands in both bores 11 and 12 are the same and a double acting motor could be controlled by the spindle 69 provided that both the chambers 62 and 62a are piped to opposite ends of the double acting motor.

Likewise the spindle 45 with its lands could be used for directing fluid to a single acting motor provided either the pipe connection 37 or 43 is disconnected and the chamber 36 or 42, whichever is disconnected, plugged. Briefly stated the spindles are interchangeable and this is of considerable advantage economically as the spindles are all alike in construction whether used with a single acting motor or a double acting motor. The motors may be connected to either side of the housing which may be of advantage in the installation of the hydraulic motor operated system. Furthermore, the valve control mechanism may be used either with two double acting motors or two single acting motors by plugging and piping and without in any way changing the valve mechanism.

The operation of the spindle 45 controlling the double acting motor is very similar to that just described in connection with the single acting motor. When the spindle is moved in a downward direction the vertex of the slot 50 in the upper end of the land 47 will make connection with the fluid pressure chamber 13 and as the land continues to move downward the V-shaped slot will be gradually uncovered and permit a gradual increase in the rate of flow of fluid from the chamber 36 through the pipe 37 to the end 38 of the motor. This downward movement of the spindle will cause the slot 50 in the upper end of the land 48 to make connection with the branch passage 27 leading to the exhaust chamber 24. When the chamber 42 is connected to this branch 27 it will permit fluid to exhaust from the left-hand side of the motor as viewed in Figure 1 through the pipe 43 and to the exhaust chamber.

This same downward movement of the spindle will cause the lower end of the land 48 to close the opening 11 between the intake chamber 15 and the by-pass chamber 30. This disconnects the pump from the exhaust chamber and permits fluid to be furnished from the pump to the fluid pressure chamber 13.

When the spindle is raised to the position shown in Figure 1 then the lands 47 and 48 are in neutral or central position and all connection between the fluid pressure chamber and the motor is closed and likewise all connection between the exhaust chamber and the motor is closed. This will hold the piston in a fixed position in the motor cylinder.

When the spindle 45 is raised to is extreme upper position as shown in Figure 2 then the slot 50 at the lower end of the land 47 will connect the fluid pressure chamber 13 with the enlarged bore or chamber 42 and through the pipe 43 with the left hand end of the motor 39. This will deliver fluid under pressure to the motor for moving the piston to the right. At the same time that the fluid pressure chamber is connected to the motor, the slot 50 at the lower end of the land 46 will connect the chamber 36 with the branch 26 of the exhaust chamber 24 and thus fluid will be returned from the right hand side of the motor through the pipe 37 to the exhaust chamber and from the exhaust chamber to the tank.

This upward movement of the spindle to connect the fluid pressure chamber with the motor will cause the land 49 to close the opening between the intake chamber and the by-pass chamber so that full pump pressure is available for delivering operating fluid to the fluid pressure chamber 13.

The slots in all of the lands are so disposed that the vertex of the slot is first connected to the fluid pressure chamber and the rate of flow of fluid increases in proportion to the shifting of the spindle. Likewise the vertex of the slot controlling the flow from the exhaust side first connects the motor to the exhaust chamber and the rate of flow of the exhaust will gradually increase in proportion to the shifting of the spindle.

The stop sleeve 60 limiting the upward movement of the spindle is longer than the sleeve 61 limiting the downward movement of the spindle. This difference in the stroke of the spindle when moved in one direction from that when moved in the other direction permits the rate of flow of fluid to one end of the cylinder to be different from the rate of flow to the other end of the cylinder. For example if the spindle 45 is moved upward which is the short stroke of the spindle, the slot 50 at the lower end of the land 47 will not be opened to full extent while if the spindle is moved downward the slot 50 at the upper end of the land 47 will make full open connection with the fluid pressure chamber. This provides for accommodating specific installation conditions where it may be desirable to have the maximum rate of flow to one end of the double acting cylinder to be less than the maximum rate of flow to the other end of the cylinder.

The two motors illustrated and the controls therefor are particularly adapted for use in an industrial truck of the type in which a load elevating carriage is adapted to lift or lower a load and wherein the carriage is tiltable in either direction for effective manipulation of the load on the carriage. The single acting motor is employed for lifting the load and the double acting motor is employed for tilting the carriage. The metering feature of the slots 50 in the land 47 permits of the double acting motor to be used for tilting the carriage fore and aft at the same time that the single acting motor is lifting the load or permitting the lowering of the same. Furthermore, this can be accomplished by an effective pressure in the double acting motor much less than that necessary to lift and hold the lifted load. This is accomplished by opening the metering slot supplying fluid to the double acting motor to a small extent while the metering slot supplying fluid to the single acting motor is open to a greater extent. If, for example, a thousand pounds per square in. pressure is required for raising the load and holding the load in a set position while two hundred pounds fluid pressure is sufficient for tilting the carriage this may be accomplished by partially opening the slot in the land furnishing fluid from the pressure chamber to the double acting motor while more fully opening the slot for connecting the pressure chamber to the single acting motor.

The differential stroke of the spindle controlling the fluid flow to and from the single acting motor may be utilized when it is desired that the speed of lowering be reduced from that of raising the load or vice versa. The differential stroke in the spindle controlling the tilting of the carriage may also be useful in preventing the piston of the double acting motor from moving away from the operating fluid through the pull of gravity on the load side of the piston. The short stroke of the spindle is the upward movement thereof and at this time the slot 50 at the lower end of the land 46 moves into connection with the branch 26 leading to the exhaust. Inasmuch as the slot is not open to full extent this will put a restriction on the flow of fluid from the right hand end of the motor as viewed in Figure 1 and aid in preventing the load from pulling away from the fluid. At the same time the slot 50 at the lower end of the land 47 through which fluid is furnished to the left hand end of a motor is not fully open and the rate of fluid flow for moving the piston is lowered. Furthermore, this limiting of the upward movement of the spindle will prevent the land 46 from completely opening the connection between the cylinder chamber 36 and the exhaust chamber 26, thus throttling the exhausting of fluid from the end 38 of the motor and tending to prevent the load through the action of gravity thereon, or any other pulling force, from moving away from the operating fluid in the end 39 which is actuating the piston.

It is obvious that minor changes in the details of construction may be made without departing from the spirit of the invention as set forth in the appended claims.

I claim:

1. A control valve mechanism for hydraulically operated motors comprising a valve housing having a bore extending therethrough, a fluid supply chamber extending transversely of the bore and connected thereto, said bore having an enlarged port adjacent one side of said fluid pressure chamber for connection to a fluid motor, a passage associated with said port and connected to an exhaust chamber, a valve spindle in said bore having lands engaging the walls of the bore, said lands being disposed so as to connect the fluid pressure chamber to said port for furnishing operating fluid to said motor when the spindle is moved in one direction and to connect said port to said passage for exhausting the operating fluid from said motor when the spindle is moved in the opposite direction, a spring associated with said spindle and normally holding the spindle in a centered position, a stop sleeve mounted on said spindle for limiting the movement of the spindle in one direction, and a second stop sleeve mounted in said housing encircling said spindle for limiting the movement of the spindle in the opposite direction, said sleeves being of different lengths so that the rate of fluid flow to the motor when the spindle is shifted in one direction is greater than the fluid flow from the motor when the spindle is shifted in the other direction.

2. A control valve mechanism for hydraulically operated motors comprising a valve housing having a bore extending therethrough, a fluid supply chamber extending transversely of the bore, said bore having enlarged ports at opposite sides of the chamber for connection respectively to the opposite ends of a double acting motor, said housing having a passage associated with each port and connected to an exhaust chamber, a valve spindle in said bore having lands engaging the walls of the bore, said lands being spaced from each other on the spindle and disposed so as to connect said fluid chamber to one end of said double acting motor and the other end of the motor to the exhaust chamber when the spindle is moved in one direction and to reverse said connections to the motor when the spindle is moved in the other direction, a spring associated with the spindle and normally holding the spindle in a centered position, a stop sleeve mounted on said spindle and adapted to engage an abutment member contacting the housing for limiting the movement of the spindle in one direction and a second stop sleeve mounted in said housing and adapted to be engaged by an abutment member movable with the spindle for limiting the movement of the spindle in the opposite direction, said sleeves being of different lengths so that the maximum fluid flow to and from the motor on the shifting of the spindle in one direction is different from that when the spindle is shifted in the other direction.

3. A control valve mechanism for hydraulically operated motors comprising a valve housing having a bore extending therethrough, a fluid supply chamber extending transversely of the bore and connected thereto, said bore having an enlarged port adjacent one side of said fluid pressure chamber for connection to a fluid motor, a passage associated with said port and connected to an exhaust chamber, a valve spindle in said bore having lands engaging the walls of the bore, said lands being disposed so as to connect the fluid pressure chamber to said port for furnishing operating fluid to said motor when the spindle is moved in one direction and to connect said port to said passage for exhausting the operating fluid from said motor when the spindle is moved in the opposite direction, said spindle at one end thereof having a pair of spaced abutment shoulders, spaced abutment means in the housing corresponding in position with said abutment shoulders when the spindle is in a central position in the bore, a small diameter washer on the spindle and normally in engagement with one of said shoulders and the respective abutment means, a larger diameter washer on the spindle and normally in engagement with the other shoulder and the respective abutment means, a spring between the washers and constantly urging the same toward the respective shoulder and abutment means, a sleeve within the spring between the washers and serving as a stop to limit movement of the washers toward each other when the spindle is moved in one direction, a second sleeve located externally of the spring and between the large diameter washer and the opposite abutment means for limiting the distance the spindle may be moved in the opposite direction.

References Cited in the file of this patent
UNITED STATES PATENTS

| | | |
|---|---|---|
| 2,247,141 | Twyman | June 24, 1941 |
| 2,335,809 | Stacy | Nov. 30, 1943 |
| 2,359,802 | Stephens | Oct. 10, 1944 |
| 2,392,421 | Stephens | Jan. 8, 1946 |
| 2,403,519 | Gardiner | July 9, 1946 |
| 2,516,449 | Coates | July 25, 1950 |
| 2,654,998 | Naylor et al. | Oct. 13, 1953 |